United States Patent [19]

Raley

[11] 4,157,237

[45] Jun. 5, 1979

[54] MOLDING ELEMENT FOR PRODUCING THERMOPLASTIC FILM

[75] Inventor: Garland E. Raley, Terre Haute, Ind.

[73] Assignee: Ethyl Corporation, Richmond, Va.

[21] Appl. No.: 922,990

[22] Filed: Jul. 10, 1978

[51] Int. Cl.² ................................................. A01J 21/00
[52] U.S. Cl. ...................................... 425/363; 264/509;
425/290; 425/328; 425/388
[58] Field of Search ............... 425/363, 290, 328, 388, 425/403, 457; 128/287; 264/90, 92

[56] References Cited

U.S. PATENT DOCUMENTS

| | | | |
|---|---|---|---|
| 3,054,148 | 9/1962 | Zimmerli | 264/92 |
| 3,546,742 | 12/1970 | Kugler | 425/290 |
| 3,708,647 | 1/1973 | Barnhart | 425/363 |
| 3,814,101 | 6/1974 | Kozak | 128/287 |
| 4,116,594 | 9/1978 | Leanna et al. | 425/363 |

*Primary Examiner*—William E. Schulz

*Attorney, Agent, or Firm*—Donald L. Johnson; John F. Sieberth; David L. Ray

[57] ABSTRACT

A rotatable perforated molding element for embossing and/or perforating thermoplastic sheet or film, the molding element including a series of perforated strips having two parallel sides and two parallel ends, the strips being wrapped about a supporting drum in a manner such that the ends of the molding strips lie in a plane generally perpendicular to the axis of rotation of the molding element and the sides of the adjacent strips contact each other, and a method for connecting the rotatable perforated molding element to a supporting drum including wrapping a series of perforated strips having two parallel sides and two parallel ends about the supporting drum in a manner such that the ends of the molding element lie in a plane generally perpendicular to the axis of rotation of the molding element and the sides of the adjacent strips contact each other, and securing the ends of the strips to the drum.

14 Claims, 3 Drawing Figures

MOLDING ELEMENT FOR PRODUCING THERMOPLASTIC FILM

BACKGROUND OF THE INVENTION

The present invention relates to thermoplastic sheet and film products. More particularly, the invention relates to a rotatable perforated molding element or screen for use in the preparation of embossed and/or perforated thermoplastic sheet or film, and a method for connecting the molding element to a supporting roll or drum.

Perforated and embossed thermoplastic sheet or film have many useful applications. Perforated film is used in gardening and farming to prevent the growth of grass and other weeds while permitting more moisture to be transmitted through the film to the soil beneath. Perforated film is also used for making disposable baby diapers. U.S. Pat. No. 3,814,101 discloses diapers employing perforated thermoplastic film which permits the flow of liquid in the direction of the absorbent material in the diaper but substantially reduces the possibility of flow in the opposite direction. Embossed film without perforations are also used in making baby diapers, and in other applications where it is important that the film have a cloth-like appearance or feel.

One of the methods for perforating thermoplastic sheet or film is disclosed in U.S. Pat. No. 3,054,148, issued to Zimmerli, which is hereby incorporated by reference. The Zimmerli patent discloses a stationary drum having a molding element mounted around the outer surface of the drum and being adapted to rotate freely thereon. A vacuum chamber is employed beneath the screen or molding element to create a pressure differential between the respective surfaces of the thermoplastic sheet to cause the plasticized sheet to flow into the perforations provided in the molding element and thereby cause a series of holes to be formed in the sheet.

Difficulties are frequently encountered when placing the molding element or screen onto the drum, particularly in achieving a snug fit about the drum. When the perforations in the molding element or screen are very fine, it is necessary to connect the screen to the drum by using a laser to weld the edges of the screen together after the screen is wrapped about the drum.

Difficulty is also commonly encountered in forming a onepiece screen which will have the exact dimensions desired. It is commonly the practice to cut a series of strips from a screen and weld panels of the screen together to form one large rectangular screen which can be wrapped about the drum and welded along one seam to achieve a fit upon the drum. However, welding a series of strips together is time consuming and expensive. It is also extremely difficult to get a snug fit of the screen to the outside of the drum. Furthermore, the screen tends to loosen on the drum with use.

THE INVENTION

In accordance with the present invention there is provided a rotatable perforated molding element for embossing and/or perforating thermoplastic sheet or film which can be quickly and easily placed in position on or removed from a support roll, the molding element including a series of perforated strips having two parallel sides and two parallel ends, the strips being wrapped about a supporting roll in a manner such that the ends of the molding strips lie in a plane generally perpendicular to the axis of rotation of the molding element and the sides of adjacent strips lie in contact with each other, and a method for connecting the rotatable perforated molding element to a supporting drum including wrapping a series of perforated strips having two parallel sides and two parallel ends about the supporting drum in a manner such that the ends of the strips lie in a plane generally perpendicular to the axis of rotation of the molding element and the sides of the adjacent strips contact each other, and securing the ends of the strips of the drum.

DESCRIPTION OF THE PREFERRED EMBODIMENTS

Figure 1:
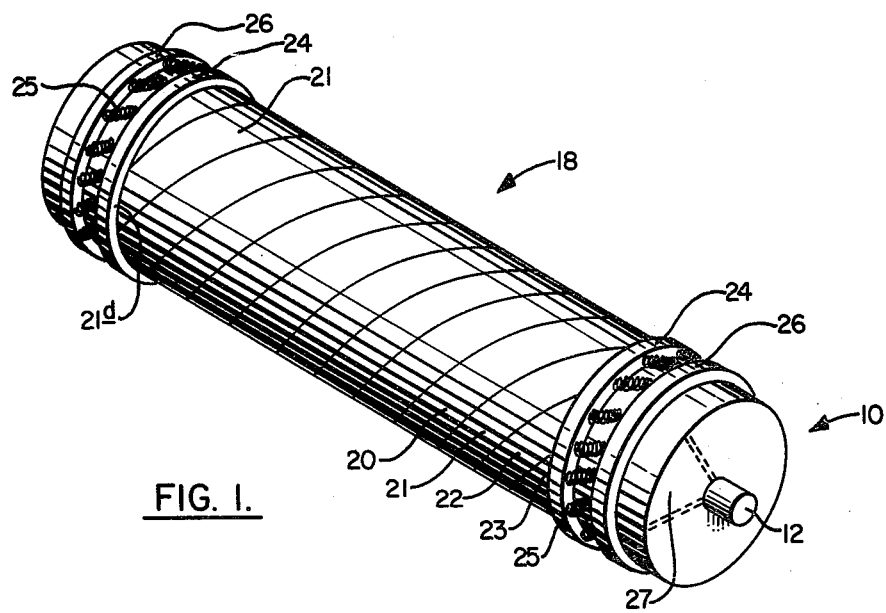
FIG. 1 shows a perspective view of a perforating drum having a molding element or screen wrapped therearound.
Figure 2:
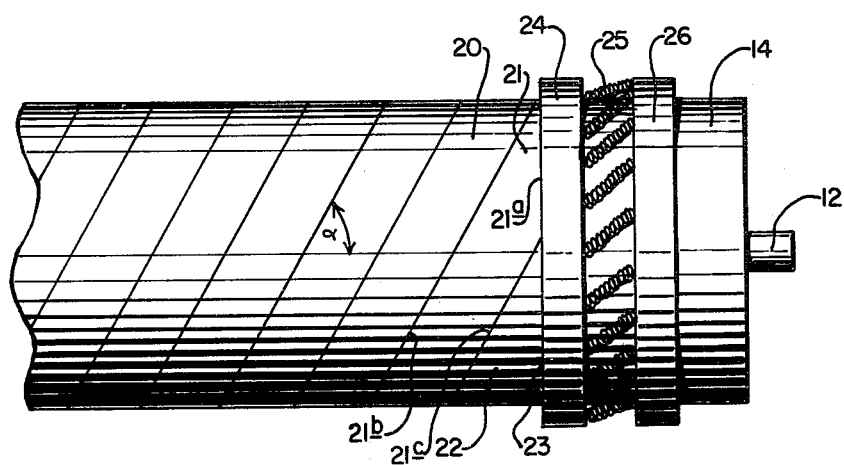
FIG. 2 is an enlarged, partially cut-away plan view of the perforating roll having a molding element or screen wrapped therearound; and, FIG. 3 is a cut-away, enlarged view of a portion of the screen of FIG. 2.

Referring now to FIG. 1, a cylindrical roll or drum 10 is shown disposed about an axle 12. The rotatable molding element of the invention is generally indicated by the numeral 18 and is shown in FIG. 1 and FIG. 2 to be wrapped about drum 10. Axle 12 defines the axis about which molding element 18 rotates.

Molding element 18 is composed of a series of strips which, for purposes of illustration, have been numbered 20, 21, 22, and 23. The strips are substantially identical in size and shape. The numbers 20 thru 23 have been used to identify four of the strips although as many strips may be used as desired and as are necessary to cover the drum given the dimensions of the strip and the dimensions of the drum.

The strips 20 thru 23 have parallel ends which are indicated for strip 21 as 21a in FIG. 2 and 21d in FIG. 1. The ends of the strips are clamped or held in place by ring 24. All of the strips are parallelograms, and thus sides 21b and 21c are parallel as are ends 21a and 21d. Ends 21a and 21d, which are typical of all of the ends of the strips 20 through 23 where they intersect rings 24—24, generally lie in a plane perpendicular to axle 12 and the axis of rotation of the molding element 18. Since strip 21 is typical of all of the strips on drum 10, all of the ends of the strips lie in a plane generally perpendicular to the axis of rotation of molding element 18. The phrase "generally perpendicular" is used to include the situation in which the ends of the strips may not lie exactly in a plane due to slight, insignificant differences in length and shape.

As seen in FIG. 2, the angle between the axis of rotation of molding element 18 and the sides of the strip is indicated by the angle α. Angle α may vary from about 5° to about 30°. Preferably, angle α varies from about 6° to about 10°.

The strips may be held on drum 10 by any conventional means. One preferred way of securing the strips to the drum is by the use of rings 24—24. Rings 24—24 may be made from a flexible elastic material which can be expanded and placed at the end of the various strips. Rings 24—24 have a notch or groove 30 therein into which the ends, such as 21a and 21b, are received and forced against the outer surface 16 of drum 10. Thus, the strips can be held on drum 10 by the rings 24—24.

To further assist rings 24—24 in holding the strips on the drum, rings 26—26 and springs 25—25 may be employed. When rings 24—24 alone are employed the strips may tend to force rings 24—24 outwardly while the roll is in operation, thus causing defects in the film and possible tearing due to the gaps between the edges of the strips. To prevent rings 24—24 from moving outwardly, the rings 26—26 firmly attach to roll 10 so that they remain stationary. The springs 25—25 are connected between rings 24—24 and 26—26 and are placed in compression to force rings 24—24 together and thereby snugly hold the strips on roll 10.

In FIG. 1 a vacuum chamber is schematically represented by the area 27 between the dotted lines at the end of drum 10 and the surface 14 of drum 10. The vacuum chamber 27 can be any conventional vacuum chamber well known in the art. Vacuum chamber 27 is similar to that disclosed in the previously mentioned Zimmerli patent although in the particular embodiment shown in the present invention, drum 10 rotates about axle 12 and molding element 18 rotates therewith. The area defined by vacuum chamber 27 remains stationary within the drum. However, if desired, drum 10 could remain stationary similar to the drum of the Zimmerli patent and rings 24—24 could be driven by sprockets and chanins or the like to rotate molding element 18 about the outer surface 14 of drum 10.

Figure 3:
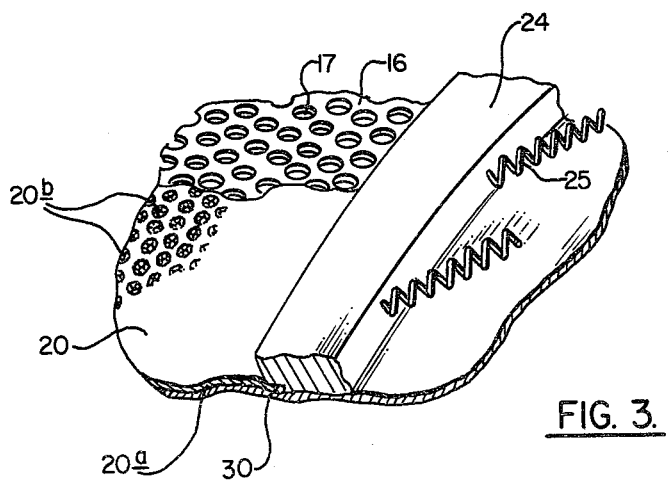

In FIG. 3, the outer surface 16 of drum 10 which lies between rings 24—24 can be seen to have perforations 17 therein for permitting a vacuum to be applied to strip 20. Strip 20 has edge 20a shown in FIG. 3 and perforations 20b therein which form holes in the thermoplastic film or sheet when a vacuum is applied thereto. The strips may be perforated in any desired pattern or design. Strip 20 is typical of all the other strips. If desired, the outer surface of drum 10 in the area of the vacuum chamber 27 could be removed in the manner described in the Zimmerli patent where the drum remains stationary. Thus, the area 16 of the outer surface of drum 10 would be eliminated with the perforations 17 therein.

Any thermoplastic material which may be formed into flexible film or sheets may be used in the production of the novel products of the present invention. Exemplary thermoplastic materials include cellulose esters, e.g., cellulose acetate, cellulose propionate, cellulose butyrate; mixed esters of cellulose; cellulose ethers, e.g., ethyl cellulose; nylon and polymeric materials, e.g., polyvinyl alcohol acetals, polyvinyl chloride, polyvinyl chloride acetate, polystyrene, methyl methacrylate, polyethylene, polypropylene, and other polyolefins which may be formed into flexible film or sheet, and the like. Sheets or films made from such materials may be plasticized with suitable plasticizers and other additives known in the art may be added to achieve the desired physical characteristics.

The molding element of the present invention can be easily and quickly attached to a supporting drum and removed for cleaning or repair. The strips are merely wrapped about the supporting drum and flexible rings 24—24 are slipped over the ends to secure or fasten the ends to the drum by forcing the ends tightly and snugly against the drum. Rings 26—26 with springs 25—25 can be added if desired.

Also, if desired, rings 24—24 could be made of metal or some other rigid material and rigidly fixed to the ends of the strips. Rings 24—24 could then be held in place on the drum 10 by rigidly attaching the rings to the drum by bolting or any other conventional means or by placing a torque on rings 24—24, for example, by rings 26—26 and springs 25. If desired, a drive means such as a chain and sprocket could be attached to one of the rigid rings to turn the molding element on a drum such as that shown in the Zimmerli patent.

Furthermore, if desired, rings 24—24 and 26—26 could be entirely and the ends of the strips could be attached to the drum by connecting springs or other resilient means to the drum and to the strips to place the strips in tension, or the ends could be fastened to the drum directly by conventional means such as bolting, screwing, or the like.

The perforated molding strips 20 may be made of metal or any other suitable material. The molding element may be made from a metal sheet having the perforated design stamped or otherwise cut from the sheet. Furthermore, perforation of the sheets may be provided by etching a plate to make holes therein.

Having fully described the invention, it is desired that it be limited only within the spirit and scope of the attached claims:

What is claimed:

1. A rotatable perforated molding element means for embossing and/or perforating thermoplastic sheet or film comprising a series of perforated strip means having two parallel sides and two parallel ends, said strip means being adapted for wrapping about a drum means for supporting said strips in a manner such that said ends of said strip means lie in a plane generally perpendicular to the axis of rotation of said molding element means and said sides of adjacent strip means contact each other.

2. The molding element means of claim 1 wherein said ends of said strip means are secured to said drum means.

3. The molding element means of claim 2 wherein said ends of said strip means are secured to said drum by spring means.

4. The molding element means of claim 2 wherein said ends are secured to said drum means by flexible first ring means.

5. The molding element means of claim 4 wherein second ring means is connected to said first ring means by resilient means to assist said first ring means in securing said ends to said drum means.

6. The molding element means of claim 5 wherein said resilient means is a spring.

7. The molding element means of claim 1 wherein said sides of said strip means form an angle with the axis of rotation of said molding element means of from about 5° to about 30°.

8. The molding element means of claim 1 wherein said sides of said strip means form an angle with the axis of rotation of said molding element means of from about 6° to about 10°.

9. The molding element means of claim 1 wherein said molding element means is adapted for rotation about said drum means.

10. The molding element means of claim 1 wherein said molding element means is adapted for securing to and rotating with said drum means.

11. A method for connecting a rotatable perforated molding element means for embossing and/or perforating thermoplastic sheet or film to drum means for supporting said molding element means, comprising:

a. wrapping a series of perforated strip means having two parallel sides and two parallel ends about said drum means in a manner such that:

i. said ends of said strip means lie in a plane generally perpendicular to the axis of rotation of said molding element means, and,
ii. said sides of adjacent strips contact each other; and,
b. securing the ends of said strip means to said drum means.

12. The method of claim 1 wherein said ends of said strip means are placed in tension to maintain said strip means against the surface of said drum means.

13. The method of claim 11 wherein said parallel sides of said strip means are wrapped about said drum means so that said sides form an angle with the axis of rotation of said drum means of from about 5° to about 30°.

14. The method of claim 11 wherein said parallel sides of said strip means are wrapped about said drum means so that said sides form an angle with the axis of rotation of said drum means of from about 6° to about 10°.

* * * * *

UNITED STATES PATENT AND TRADEMARK OFFICE
CERTIFICATE OF CORRECTION

PATENT NO. : 4,157,237
DATED : June 5, 1979
INVENTOR(S) : GARLAND E. RALEY

It is certified that error appears in the above-identified patent and that said Letters Patent are hereby corrected as shown below:

Column 4, Line 7, "could be entirely" should read -- could be omitted entirely --.

Signed and Sealed this

Twenty-fifth Day of September 1979

[SEAL]

Attest:

LUTRELLE F. PARKER
*Attesting Officer*  *Acting Commissioner of Patents and Trademarks*

UNITED STATES PATENT AND TRADEMARK OFFICE
CERTIFICATE OF CORRECTION

PATENT NO. : 4,157,237
DATED : JUNE 6, 1979
INVENTOR(S) : GARLAND E. RALEY

It is certified that error appears in the above-identified patent and that said Letters Patent is hereby corrected as shown below:

Column 5, line 9, " 1 " should read -- 11 --.

Signed and Sealed this

Twenty-third Day of December, 1986

Attest:

DONALD J. QUIGG

Attesting Officer     Commissioner of Patents and Trademarks